United States Patent
Yu et al.

(10) Patent No.: US 11,483,878 B2
(45) Date of Patent: Oct. 25, 2022

(54) SESSION ESTABLISHMENT METHOD AND SYSTEM, AND DEVICE

(71) Applicant: HUAWEI TECHNOLOGIES CO., LTD., Shenzhen (CN)

(72) Inventors: Youyang Yu, Shanghai (CN); Ming Jiang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/911,465

(22) Filed: Jun. 25, 2020

(65) Prior Publication Data

US 2020/0329511 A1    Oct. 15, 2020

Related U.S. Application Data

(63) Continuation of application No. PCT/CN2018/119668, filed on Dec. 7, 2018.

(30) Foreign Application Priority Data

Dec. 29, 2017    (CN) .......................... 201711477272.0

(51) Int. Cl.
*H04W 76/10* (2018.01)
*H04W 8/24* (2009.01)
(Continued)

(52) U.S. Cl.
CPC ............ *H04W 76/10* (2018.02); *H04W 8/24* (2013.01); *H04W 60/00* (2013.01); *H04W 72/04* (2013.01)

(58) Field of Classification Search
CPC ..... H04W 60/00; H04W 72/04; H04W 76/10; H04W 76/11; H04W 76/20; H04W 8/24
See application file for complete search history.

(56) References Cited

U.S. PATENT DOCUMENTS

2014/0105145 A1    4/2014    Gao et al.
2014/0113637 A1    4/2014    Guan et al.
(Continued)

FOREIGN PATENT DOCUMENTS

CN    1964564 A    5/2007
CN    102843739 A    12/2012
(Continued)

OTHER PUBLICATIONS

3GPP TR 23. 799,V14.0.0,Anonymous: "3rd Generation Partnership Project; Technical Specification Group Services and System Aspects; Study on Architecture for Next Generation System (Release 14)", Dec. 16, 2016 (Dec. 16, 2016), pp. 1-522, XP051295448.
(Continued)

*Primary Examiner* — Erica Navar
(74) *Attorney, Agent, or Firm* — Rimon PC

(57) ABSTRACT

Various embodiments provide a session establishment method and system, and a device, to resolve a prior-art problem that NAS message transfer cannot be separated from session user plane establishment and application in some scenarios is limited. In those embodiment, under the establishment method, a first non-access stratum (NAS) message is sent by a terminal to a first access network device corresponding to a first access technology, where the first NAS message is used to request to establish a session. A second NAS message from the first access network device can be received by the terminal, where the second NAS message carries an identifier of a user plane function network element. A session establishment procedure can be initiated by the terminal between the terminal and the user plane function network element based on the identifier of the user plane function network element by using a second access technology.

12 Claims, 8 Drawing Sheets

(51) Int. Cl.
*H04W 60/00* (2009.01)
*H04W 72/04* (2009.01)

(56) References Cited

U.S. PATENT DOCUMENTS

2017/0339609 A1* 11/2017 Youn .................. H04W 76/11
2018/0199398 A1* 7/2018 Dao ................... H04L 41/5041

FOREIGN PATENT DOCUMENTS

| CN | 102869116 | A | 1/2013 |
| CN | 104937964 | A | 9/2015 |
| CN | 106572495 | A | 4/2017 |
| CN | 106792936 | A | 5/2017 |
| CN | 106851856 | A | 6/2017 |
| CN | 107396455 | A | 11/2017 |
| EP | 3720203 | A1 | 10/2020 |
| WO | 2011006404 | A1 | 1/2011 |
| WO | 2017219972 | A1 | 12/2017 |

OTHER PUBLICATIONS

3GPP TS 23.501 ,V15.0.0,Anonymous: 113rd Genera ti on Partnership Project; Technical Specification Group Services and System Aspects; System Architecture for the 5G System; Stage 2 (Release 15), Dec. 22, 2017 (Dec. 22, 2017), pp. 1-181, XP051392101.

Huawei et al: "01#24a—TS 23.502: Correction to Handover and PDU session establishment for N3GPP access", 3GPP Draft; S2-177729,Oct. 30, 2017 (Oct. 30, 2017), XP051360371,total 10 pages.

3GPP TS 23.502,V15.0.0, "3rd Generation Partnership Project; Technical Specification Group Services and System Aspects; Procedures for the 5G System; Stage 2 (Release 15)", Dec. 22, 2017 (Dec. 22, 2017), pp. 1-258, XP051392102.

S2-178255 Nokia, Nokia Shanghai Bell,"OI #18 23.502: (NAS SM: split)+ Correcting information flows in § 4.3 (PDU session related)",SA WG2 Meeting #124,Nov. 27-Dec. 1, 2017, Reno, NV, USA,total 35 pages.

S2-178288 Samsung,"TS 23.501: AMF and SMF operations for the LADN PDU Session",SA WG2 Meeting #S2-124, Nov. 27-Dec. 1, 2017, Reno, NV, USA,total 4 pages.

3GPP TS 23.501 V15.0.0 (Dec. 2017),3rd Generation Partnership Project;Technical Specification Group Services and System Aspects;System Architecture for the 5G System;Stage 2(Release 15),total 181 pages.

S2-172493 Ericsson,"23.502: Handover between 3GPP and non-3GPP access",SA WG2 Meeting #120,Mar. 27-31, 2017, Busan, Korea,total 8 pages.

S2-166398 Ericsson,"non-3GPP user plane",SA WG2 Meeting #118,Nov. 14-18, 2016, Reno, Nevada, USA,total 5 pages.

S2-178844 Huawei, Hisilicon,"TS 23.501: Update of handling Ethernet and Unstructured PDU session types when moving to EPS",SA WG2 Meeting #124 Nov. 25-Dec. 1, 2017, Reno, USA,total 6 pages.

BBK Wiki SD-407 5G Fixed Mobile Convergence Study (Draft),pulished on Aug. 10, 2017, total 23 pages.

* cited by examiner

US 11,483,878 B2

SESSION ESTABLISHMENT METHOD AND SYSTEM, AND DEVICE

CROSS-REFERENCE TO RELATED APPLICATIONS

This application is a continuation of International Patent Application No. PCT/CN2018/119668, filed on Dec. 7, 2018, which claims priority to Chinese Patent Application No. 201711477272.0, filed on Dec. 29, 2017, The disclosures of the aforementioned applications are hereby incorporated by reference in their entireties.

TECHNICAL FIELD

The present disclosure relates to the field of communications technologies, and in particular, to a session establishment method and system, and a device.

BACKGROUND

To address challenges from wireless broadband technologies and keep 3rd generation partnership project (3GPP) networks at the leading edge, the 3GPP standardization group formulated a network architecture of a next generation mobile communications system (next generation system) at the end of 2016, which is referred to as a 5th generation (5G) network architecture. This architecture allows a terminal to access a 5G core network (5GC) using not only a 3GPP access technology, but also a non-3GPP (non-3GPP) access technology.

Currently, a process in which the terminal accesses the 5GC may include a registration procedure and a session establishment procedure. In the registration procedure, the terminal first establishes a connection to an access network side, and then sends a registration request message to an access and mobility management function (AMF) network element. The AMF network element interacts with an authentication server function (AUSF) network element to complete access authentication of the terminal. After the terminal is successfully registered, the terminal initiates the session establishment procedure. To be specific, the terminal sends a protocol data unit (PDU) session establishment request to a session management function (SMF) network element, and the SMF network element instructs a user plane function (UPF) network element to establish a user plane of a session.

According to a definition in an existing solution, an access network device that forwards the PDU session establishment request is an access network device that subsequently establishes the user plane of the session with the UPF network element. In other words, in the prior art, one access device may have two functions: forwarding a non-access stratum (NAS) message, for example, the PDU session establishment request; and establishing a user plane of a session. Consequently, NAS message transfer cannot be separated from user plane establishment, and application in some scenarios is limited. For example, when a non-3GPP access network is a fixed network, although there is a complete user plane processing solution for an access network side of the fixed network and a user plane of a session can be established, the access network side of the fixed network may not support NAS message transfer due to a limitation of conventional fixed network deployment. Consequently, a terminal cannot access a 5GC.

Therefore, how to separate a NAS message transfer function from a session user plane establishment function so as to provide more diversified services for a terminal is now an urgent technical problem that needs to be resolved.

SUMMARY

Embodiments of this application provide a session establishment method and system, and a device, to resolve a prior-art problem that NAS message transfer cannot be separated from session user plane establishment and application in some scenarios is limited.

To achieve the foregoing objective, the embodiments of this application provide the following technical solutions.

According to a first aspect, a session establishment method is provided, where the method includes: sending, by a terminal, a first non-access stratum NAS message to a first access network device corresponding to a first access technology, where the first NAS message is used to request to establish a session; receiving, by the terminal, a second NAS message from the first access network device, where the second NAS message carries an identifier of a user plane function network element; and initiating, by the terminal, a session establishment procedure between the terminal and the user plane function network element based on the identifier of the user plane function network element by using a second access technology. According to the session establishment method provided in this embodiment, in this embodiment, the first access network device corresponding to the first access technology may forward a NAS message, and the session establishment procedure between the terminal and the user plane function network element may be initiated by using the second access technology. In other words, based on different access technologies, a NAS message transfer function can be separated from a session user plane establishment function. Therefore, more diversified services can be provided for the terminal.

In a possible design, the identifier of the user plane function network element includes an internet protocol IP address or a fully qualified domain name FQDN identifier of the user plane function network element, and the initiating, by the terminal, a session establishment procedure between the terminal and the user plane function network element based on the identifier of the user plane function network element by using a second access technology includes: sending, by the terminal, a request message to the user plane function network element based on the IP address or FQDN identifier of the user plane function network element by using the second access technology, where the request message is used to establish an internet protocol security IPSec connection between the terminal and the user plane function network element. Based on this solution, the terminal may establish the session between the terminal and the user plane function network element by using the second access technology.

According to a second aspect, a session establishment method is provided, where the method includes: receiving, by a session management network element, a first non-access stratum NAS message from a first access network device corresponding to a first access technology, where the first NAS message is used to request to establish a session; and sending, by the session management network element, a second NAS message to the first access network device, where the second NAS message carries an identifier of a user plane function network element, and the identifier of the user plane function network element is used to indicate a terminal to establish the session by using the user plane function network element. For a technical effect of the second aspect, refer to the technical effect of the first aspect. Details are not described herein.

In a possible design, after the session management network element allows the terminal to establish the session by using a second access technology, the method further includes: selecting, by the session management network element for the session based on at least one of location information of the terminal, information about the user plane function network element, or a first indication information, the user plane function network element that supports access using the second access technology. Based on this solution, the user plane function network element that supports access using the second access technology may be selected for the session.

According to a third aspect, a session establishment method is provided, where the method includes: receiving, by a session management network element, a first non-access stratum NAS message from a first access network device corresponding to a first access technology, where the first NAS message is used to request to establish a session; sending, by the session management network element, a first message to a user plane function network element; receiving, by the user plane function network element, the first message from the session management network element, and allocating a network-side session resource to a terminal based on the first message; sending, by the user plane function network element, a second message to the session management network element, where the second message carries the network-side session resource; and receiving, by the session management network element, the second message from the user plane function network element, and sending a second NAS message to the first access network device, where the second NAS message carries an identifier of the user plane function network element, and the identifier of the user plane function network element is used to indicate the terminal to establish the session by using the user plane function network element. For a technical effect of the third aspect, refer to the technical effect of the first aspect. Details are not described herein.

With reference to the first aspect, the second aspect, or the third aspect, in a possible design, the second NAS message further carries a terminal identifier, and the terminal identifier is used by the user plane function network element to identify the terminal.

With reference to the first aspect, the second aspect, or the third aspect, in a possible design, the first NAS message carries a terminal identifier, and the terminal identifier is used by the user plane function network element to identify the terminal.

With reference to the first aspect, the second aspect, or the third aspect, in a possible design, the second NAS message further carries second indication information, and the second indication information is used to indicate a session establishment procedure between the terminal and the user plane function network element to be initiated by using the second access technology.

According to a fourth aspect, a session establishment method is provided, where the method includes: in a process in which a terminal establishes a connection to a user plane function network element by using a second access technology, obtaining, by the terminal, an identifier of the user plane function network element; and sending, by the terminal, a first non-access stratum NAS message to a first access network device corresponding to a first access technology, where the first NAS message carries the identifier of the user plane function network element, and the identifier of the user plane function network element is used by the terminal to establish a session by using the user plane function network element. According to the session establishment method provided in this embodiment, in this embodiment, the first access network device corresponding to the first access technology may forward a NAS message, and the user plane function network element corresponding to the second access technology may establish a user plane of a session. In other words, based on different access technologies, a NAS message transfer function can be separated from a session user plane establishment function. Therefore, more diversified services can be provided for the terminal.

In a possible design, after the sending, by the terminal, a first NAS message to a first access network device corresponding to a first access technology, the method further includes: receiving, by the terminal, a second NAS message from the first access network device, where the second NAS message carries a resource identifier corresponding to the session, and the resource identifier is used by the user plane function network element to identify the session.

In this scenario, there are the following several possible implementations. Case 1: The first NAS message carries the identifier of the user plane function network element, and the second NAS message carries a terminal identifier. In some embodiments, the second NAS message may further carry the resource identifier. Case 2: The first NAS message carries the identifier of the user plane function network element and a terminal identifier. In some embodiments, the second NAS message carries the resource identifier.

In a possible design, after the sending, by the terminal, a first NAS message to a first access network device corresponding to a first access technology, the method further includes: receiving, by the terminal, a resource identifier corresponding to the session from the user plane function network element, where the resource identifier is used by the user plane function network element to identify the session; and receiving, by the terminal, a second NAS message from the first access network device.

In this scenario, there are the following several possible implementations. Case 1: The first NAS message carries the identifier of the user plane function network element. For the second NAS message, refer to an existing second NAS message. In addition, the terminal further receives the terminal identifier from the second access network device. Case 2: The first NAS message carries the identifier of the user plane function network element and the terminal identifier. For the second NAS message, refer to an existing second NAS message.

According to a fifth aspect, a session establishment method is provided, where the method includes: receiving, by a session management network element, a first non-access stratum NAS message from a first access network device corresponding to a first access technology, where the first NAS message carries an identifier of a user plane function network element accessed by a terminal using a second access technology; and sending, by the session management network element, a first message to the user plane function network element, where the first message is used to request to establish the session by using the user plane function network element corresponding to the identifier of the user plane function network element. For a technical effect of the fifth aspect, refer to the technical effect of the fourth aspect. Details are not described herein.

In a possible design, after the sending, by the session management network element, a first message to the user plane function network element, the method further includes: receiving, by the session management network element, a second message from the user plane function network element, where the second message carries at least one of a resource identifier corresponding to the session or a terminal identifier, the terminal identifier is used by the user plane function network element to identify the terminal, and the resource identifier is used by the user plane function network element to identify the session; and sending, by the session management network element, a second NAS message to the first access network device, where the second NAS message carries the at least one of the resource identifier or the terminal identifier.

In a possible design, the method further includes: selecting, by the session management network element, the user plane function network element for the session based on the identifier of the user plane function network element.

With reference to the fourth aspect or the fifth aspect, in a possible design, the second NAS message further carries indication information, and the indication information is used to indicate the session to be established by using the user plane function network element accessed using the second access technology.

According to a sixth aspect, a session establishment method is provided, where the method includes: receiving, by a session management network element, a first non-access stratum NAS message from a first access network device corresponding to a first access technology, where the first NAS message carries an identifier of a user plane function network element accessed by a terminal using a second access technology; sending, by the session management network element, a first message to the user plane function network element corresponding to the identifier of the user plane function network element; and receiving, by the user plane function network element, the first message from the session management network element, and establishing the session based on the first message. For a technical effect of the sixth aspect, refer to the technical effect of the fourth aspect. Details are not described herein.

With reference to the second aspect, the third aspect, the fifth aspect, or the sixth aspect, in a possible design, the method further includes: obtaining, by the session management network element, at least one of location information of the terminal, subscription data of the terminal, first indication information, or a local policy, where the first indication information is used by the terminal to request to establish the session by using the second access technology; and allowing, by the session management network element based on the at least one of the location information of the terminal, the subscription data of the terminal, the first indication information, or the local policy, the terminal to establish the session by using the second access technology. Based on this solution, a session establishment failure can be avoided when the terminal subsequently establishes the session by using the second access technology, and reliability of the session establishment method is improved.

With reference to any one of the foregoing aspects, in a possible design, the first NAS message further carries the first indication information, and the first indication information is used by the terminal to request to establish the session by using the second access technology.

According to a seventh aspect, a terminal is provided, where the terminal has a function of implementing the method according to any one of possible design of the first aspect or the fourth aspect. The function may be implemented by hardware, or may be implemented by hardware executing corresponding software. The hardware or the software includes one or more modules corresponding to the foregoing function.

According to an eighth aspect, a terminal is provided, including a processor and a memory, where the memory is configured to store a computer-executable instruction, and when the terminal runs, the processor executes the computer-executable instruction stored in the memory, to enable the terminal to perform the session establishment method according to any one of possible design of the first aspect or the fourth aspect.

According to a ninth aspect, a computer-readable storage medium is provided, where the computer-readable storage medium stores an instruction, and when the instruction is run on a computer, the computer is enabled to perform the session establishment method according to any one of possible design of the first aspect or the fourth aspect.

According to a tenth aspect, a computer program product including an instruction is provided, where when the computer program product runs on a computer, the computer is enabled to perform the session establishment method according to the any one of possible design of first aspect or the fourth aspect.

For a technical effect brought by any design of the seventh aspect to the tenth aspect, refer to the technical effects brought by the different designs of the first aspect or the fourth aspect. Details are not described herein.

According to an eleventh aspect, a session management network element is provided, and the session management network element has a function of implementing the method according to any one of possible design of the second aspect or the fifth aspect. The function may be implemented by hardware, or may be implemented by hardware executing corresponding software. The hardware or the software includes one or more modules corresponding to the foregoing function.

According to a twelfth aspect, a session management network element is provided, including a processor and a memory, where the memory is configured to store a computer-executable instruction, and when the session management network element runs, the processor executes the computer-executable instruction stored in the memory, to enable the session management network element to perform the session establishment method according to any one of possible design of the second aspect or the fifth aspect.

According to a thirteenth aspect, a computer-readable storage medium is provided, where the computer-readable storage medium stores an instruction, and when the instruction is run on a computer, the computer is enabled to perform the session establishment method according to any one of possible design of the second aspect or the fifth aspect.

According to a fourteenth aspect, a computer program product including an instruction is provided, where when the computer program product runs on a computer, the computer is enabled to perform the session establishment method according to any one of possible design of the second aspect or the fifth aspect.

For a technical effect brought by any design of the eleventh aspect to the fourteenth aspect, refer to the technical effects brought by the different designs of the second aspect or the fifth aspect. Details are not described herein.

According to a fifteenth aspect, a session establishment system is provided, where the session establishment system includes a session management network element and a user plane function network element, where the session management network element is configured to receive a first non-access stratum NAS message from a first access network device corresponding to a first access technology, where the first NAS message is used to request to establish a session; the session management network element is further configured to send a first message to the user plane function network element; the user plane function network element is configured to: receive the first message from the session management network element, and allocate a network-side session resource to a terminal based on the first message; the user plane function network element is further configured to send a second message to the session management network element, where the second message carries the network-side session resource; and the session management network element is further configured to receive the second message from the user plane function network element, and send a second NAS message to the first access network device, where the second NAS message carries an identifier of the user plane function network element, and the identifier of the user plane function network element is used to indicate the terminal to establish the session by using the user plane function network element. For a technical effect of the fifteenth aspect, refer to the technical effect of the first aspect. Details are not described herein.

In a possible design, the user plane function network element is further configured to allocate a terminal identifier to the terminal, or the user plane function network element is further configured to receive the terminal identifier from the session management network element, where the terminal identifier is used by the user plane function network element to identify the terminal; and the second NAS message further carries the terminal identifier correspondingly.

In a possible design, the user plane function network element is further configured to receive a request message from the terminal by using a second access technology; and the user plane function network element is further configured to establish an interne protocol security IPSec connection between the terminal and the user plane function network element based on the request message.

According to a sixteenth aspect, a session establishment system is provided, where the session establishment system includes a session management network element and a user plane function network element, where the session management network element is configured to receive a first non-access stratum NAS message from a first access network device corresponding to a first access technology, where the first NAS message carries an identifier of the user plane function network element accessed by a terminal using a second access technology; the session management network element is further configured to send a first message to the user plane function network element corresponding to the identifier of the user plane function network element; and the user plane function network element is configured to: receive the first message from the session management network element, and establish the session based on the first message.

In a possible design, the user plane function network element is further configured to send a second message to the session management network element, where the second message carries at least one of a resource identifier corresponding to the session or a terminal identifier, the terminal identifier is used by the user plane function network element to identify the terminal, and the resource identifier is used by the user plane function network element to identify the session; and the session management network element is further configured to: receive the second message from the user plane function network element, and send a second NAS message to the first access network device, where the second NAS message carries the at least one of the terminal identifier or the resource identifier.

In a possible design, the user plane function network element is further configured to send a third message to the terminal, where the third message carries at least one of a resource identifier corresponding to the session or a terminal identifier, the terminal identifier is used by the user plane function network element to identify the terminal, and the resource identifier is used by the user plane function network element to identify the session; the user plane function network element is further configured to send a second message to the session management network element, where the second message carries a network-side session resource allocated by the user plane function network element to the terminal; and the session management network element is further configured to: receive the second message from the user plane function network element, and send a second NAS message to the first access network device.

In a possible design, the user plane function network element is further configured to allocate the terminal identifier to the terminal, or the user plane function network element is further configured to receive the terminal identifier from the session management network element.

In a possible design, the user plane function network element is further configured to allocate the resource identifier to the terminal, or the user plane function network element is further configured to receive the resource identifier from the session management network element.

These aspects or other aspects in this application are made clearer and more intelligible in descriptions in the following embodiments.

DESCRIPTION OF EMBODIMENTS

The following describes the technical solutions in various embodiments with reference to the accompanying drawings in the embodiments of this application. In the descriptions of this application, "/" means "or" unless otherwise specified. For example, A/B may indicate A or B. In this specification, "and/or" describes only an association relationship for describing associated objects and indicates that three relationships may exist. For example, A and/or B may indicate the following three cases: Only A exists, both A and B exist, and only B exists. In addition, in the descriptions of this application, "a plurality of" means two or more than two unless otherwise specified. In addition, to clearly describe the technical solutions in various embodiments, the terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 1:
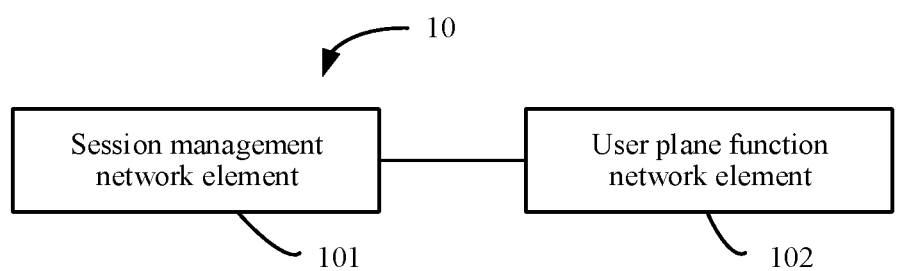
FIG. 1 is a schematic flowchart 1 of a session establishment system according to an embodiment.

FIG. 1 shows a session establishment system 10 according to an embodiment. The session establishment system 10 includes a session management network element 101 and a user plane function network element 102.

In a possible implementation, the session management network element 101 is configured to receive a first NAS message from a first access network device corresponding to a first access technology. The first NAS message is used to request to establish a session.

The session management network element 101 is further configured to send a first message to the user plane function network element 102.

The user plane function network element 102 is configured to: receive the first message from the session management network element 101, and allocate a network-side session resource to a terminal based on the first message; and then send a second message to the session management network element 101. The second message carries the network-side session resource.

The session management network element 101 is further configured to receive the second message from the user plane function network element 102, and send a second NAS message to the first access network device. The second NAS message carries an identifier of the user plane function network element 101. The identifier of the user plane function network element is used to indicate the terminal to establish the session by using the user plane function network element 101.

Based on the session establishment system provided in this embodiment, the first access network device corresponding to the first access technology may forward a NAS message, and a session establishment procedure between the terminal and the user plane function network element may be initiated by using a second access technology. In other words, based on different access technologies, a NAS message transfer function can be separated from a session user plane establishment function. Therefore, more diversified services can be provided for the terminal.

Alternatively, in another example implementation, the session management network element 101 is configured to receive a first NAS message from a first access network device corresponding to a first access technology. The first NAS message carries an identifier of the user plane function network element 102 accessed by a terminal using a second access technology.

The session management network element 101 is further configured to send a first message to the user plane function network element 102 corresponding to the identifier of the user plane function network element 102.

The user plane function network element 102 is further configured to: receive the first message from the session management network element 101, and establish a session based on the first message.

Based on the session establishment system provided in this embodiment, the first access network device corresponding to the first access technology may forward a NAS message, and the user plane function network element accessed using the second access technology may establish a user plane of a session. In other words, based on different access technologies, a NAS message transfer function can be separated from a session user plane establishment function. Therefore, more diversified services can be provided for the terminal.

In some embodiments, the session management network element 101 and the user plane function network element 102 in this embodiment may directly communicate with each other, or may communicate with each other through forwarding by another device. This is not specifically limited in this embodiment.

In some embodiments, the session in the embodiments of this application may be, for example, a PDU session. A general description is provided herein. This is not specifically limited in the embodiments of this application.

In some embodiments, the session in the embodiments of this application may also be referred to as an internet protocol (IP) connection or a transmission control protocol (TCP) connection. A general description is provided herein. This is not specifically limited in the embodiments of this application.

In some embodiments, for session establishment in the embodiments of this application, there may be specifically the following cases: A new session is established on both an air interface side (or an access side) and a core network side. Alternatively, a session resource exists on a core network side, but a new session is established on an air interface side (or an access side), and such a case may also be referred to as session resumption or session update. A general description is provided herein. This is not specifically limited in the embodiments of this application.

In some embodiments, the session establishment in the embodiments of this application specifically refers to establishment of a user plane of the session. A general description is provided herein, and details are not described below again.

In some embodiments, the first access technology may be a 3GPP access technology, and the second access technology may be a non-3GPP access technology. Alternatively, in some embodiments, the first access technology may be a non-3GPP access technology, and the second access technology may be a 3GPP access technology. Alternatively, in some embodiments, the first access technology may be a 3GPP access technology, and the second access technology may be another access technology. Alternatively, in some embodiments, the first access technology may be a non-3GPP access technology, and the second access technology may be another access technology. Alternatively, in some embodiments, the first access technology and the second access technology each are another access technology. This is not specifically limited in various embodiments.

The 3GPP access technology in various embodiments may be a 5G radio access network (RAN) technology or another future 3GPP access technology. The non-3GPP access technology in the embodiments of this application may be a wireless fidelity (WiFi) access technology, a wireless local area network (WLAN) access technology, a fixed network access technology, or another future non-3GPP access technology. This is not specifically limited in the embodiments of this application.

In various embodiments, an access network device corresponding to the 3GPP access technology may be, for example, a RAN device in a 5G network, an evolved universal terrestrial radio access network (E-UTRAN) device in a 4th generation (4rd generation, 4G) network, or a UTRAN device in a 3rd generation (3rd generation) network. An access network device corresponding to the non-3GPP access technology may be, for example, a non-3GPP interworking function (N3IWF) network element, a trusted access gateway, or an access gateway function (AGF) network element corresponding to a fixed network access technology in the 5G network, or an untrusted evolved packet data gateway (ePDG) or a trusted ePDG in the 4G network. This is not specifically limited in the embodiments of this application.

In some embodiments, the N3IWF network element in the embodiments of this application may also be referred to as a next generation packet data gateway (NG-PDG), a non-3GPP access gateway (N3G-GW), or the like. This is not specifically limited in the embodiments of this application.

In some embodiments, the session establishment system 10 shown in FIG. 1 may be applied to a 5G network and another future network. This is not specifically limited in this embodiment of the present invention.

Figure 2:
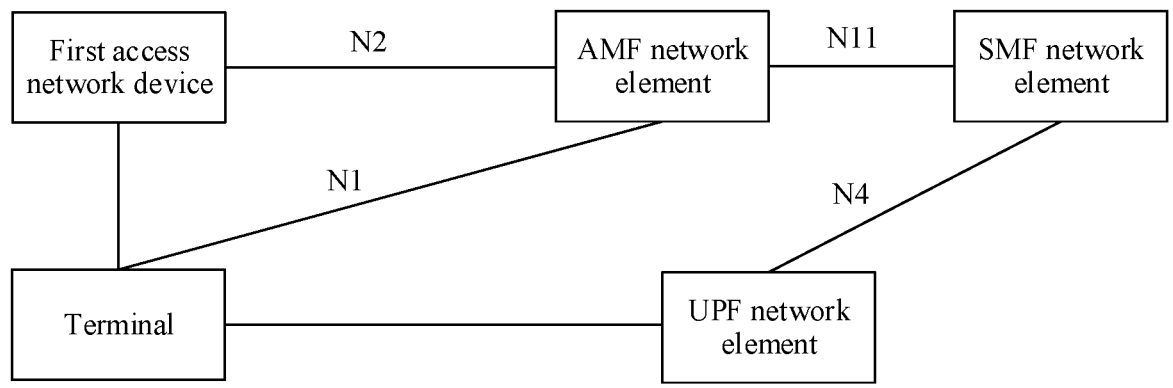
FIG. 2 is a schematic diagram of application of a session establishment system to a 5G network according to an embodiment.

For example, it is assumed that the session establishment system 10 shown in FIG. 1 is applied to a 5G network. As shown in FIG. 2, a network element or an entity corresponding to the foregoing session management network element may be an SMF network element in the 5G network, and a network element or an entity corresponding to the foregoing user plane function network element may be a UPF network element in the 5G network.

In addition, as shown in FIG. 2, the 5G network may further include a first access network device corresponding to a first access technology and an AMF network element. A terminal accesses the network via the first access network device corresponding to the first access technology, and accesses the user plane function network element using a second access technology. The terminal communicates with the AMF network element through a next generation (N) interface 1 (N1 for short). The first access network device communicates with the AMF network element through an N2 interface (N2 for short). The AMF network element communicates with the SMF network element through an N11 interface (N11 for short). The UPF network element communicates with the SMF network element through an N4 interface (N4 for short).

Although not shown, the 5G network may further include another network element, for example, a unified data management (UDM) network element, an AUSF network element, or a policy control function (PCF) network element. This is not specifically limited in the embodiments of this application.

It should be noted that, names of the interfaces between the network elements in FIG. 2 are merely examples and the interfaces may have other names in specific implementation. This is not specifically limited in the embodiments of this application.

It should be noted that, the first access network device, the AMF network element, the SMF network element, the UPF network element, and the like in FIG. 2 are merely names, and the names constitute no limitation on the devices. In the 5G network and another future network, network elements or entities corresponding to the first access network device, the AMF network element, the SMF network element, and the UPF network element may have other names. This is not specifically limited in the embodiments of this application. For example, the UPF network element may be replaced by a UPF or a UPF network element. A general description is provided herein, and details are not described below again.

In some embodiments, the terminal may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, the devices mentioned above are collectively referred to as the terminal in this application.

In some embodiments, the session management network element or the user plane function network element in FIG. 1 may be implemented by one device, or may be jointly implemented by a plurality of devices, or may be one functional module in one device. This is not specifically limited in this embodiment. It can be understood that, the foregoing functions may be network elements in a hardware device, or may be software functions running on dedicated hardware, or may be virtualization functions instantiated on a platform (for example, a cloud platform).

Figure 3:
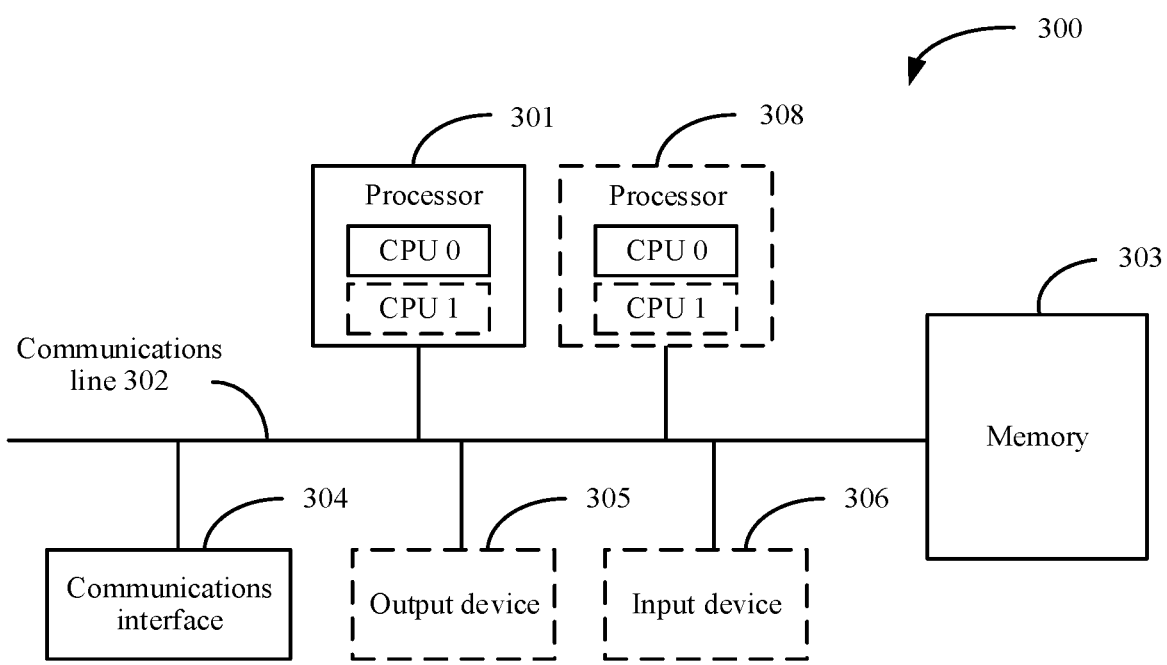
FIG. 3 is a schematic diagram of a hardware structure of a communications device according to an embodiment.

For example, the session management network element or the user plane function network element in FIG. 1 may be implemented by a communications device in FIG. 3. FIG. 3 is a schematic diagram of a hardware structure of a communications device according to an embodiment. The communications device 300 includes at least one processor 301, a communications line 302, a memory 303, and at least one communications interface 304.

The processor 301 may be a general-purpose central processing unit (CPU), a microprocessor, an application-specific integrated circuit (ASIC), or one or more integrated circuits configured to control program execution of the solutions of this application.

The communications line 302 may include a path, to transfer information between the foregoing components.

The communications interface 304, which uses any apparatus such as a transceiver, is configured to communicate with another device or communications network, such as the Ethernet, a radio access network (RAN), or a wireless local area network (WLAN).

The memory 303 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 303 is not limited thereto. The memory may exist independently, and is connected to the processor by using the communications line 302. The memory may alternatively be integrated with the processor.

The memory 303 is configured to store a computer-executable instruction for executing the solutions of this application, and the processor 301 controls the execution. The processor 301 is configured to execute the computer-executable instruction stored in the memory 303, to implement a session establishment method provided in the following embodiments of this application.

In some embodiments, the computer-executable instruction in the embodiments of this application may also be referred to as application program code. This is not specifically limited in the embodiments of this application.

During example implementation, in an embodiment, the processor 301 may include one or more CPUs, for example, a CPU 0 and a CPU 1 in FIG. 3.

During example implementation, in an embodiment, the communications device 300 may include a plurality of processors, for example, the processor 301 and a processor 308 in FIG. 3. Each of the processors may be a single-core (single-CPU) processor or a multi-core (multi-CPU) processor. The processor herein may be one or more devices, circuits, and/or processing cores for processing data (for example, computer program instructions).

During example implementation, in one embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector (projector). The input device 306 communicates with the processor 301, and may receive an input of a user in a plurality of manners. For example, the input device 306 may be a mouse, a keyboard, a touchscreen device, or a sensor device.

The communications device 300 may be a general-purpose device or a dedicated device. During specific implementation, the communications device 300 may be a desktop computer, a portable computer, a network server, a personal digital assistant (PDA), a mobile phone, a tablet computer, a wireless terminal device, an embedded device, or a device with a structure similar to that in FIG. 3. A type of the communications device 300 is not limited in this embodiment.

The following describes in detail a session establishment method provided in various embodiments with reference to FIG. 1 to FIG. 3.

It should be noted that, names of messages or parameters in the messages between network elements in the following embodiments of this application are merely examples, and the messages or the parameters may have other names in specific implementation. A general description is provided herein. This is not specifically limited in the embodiments of this application.

Figure 4A:
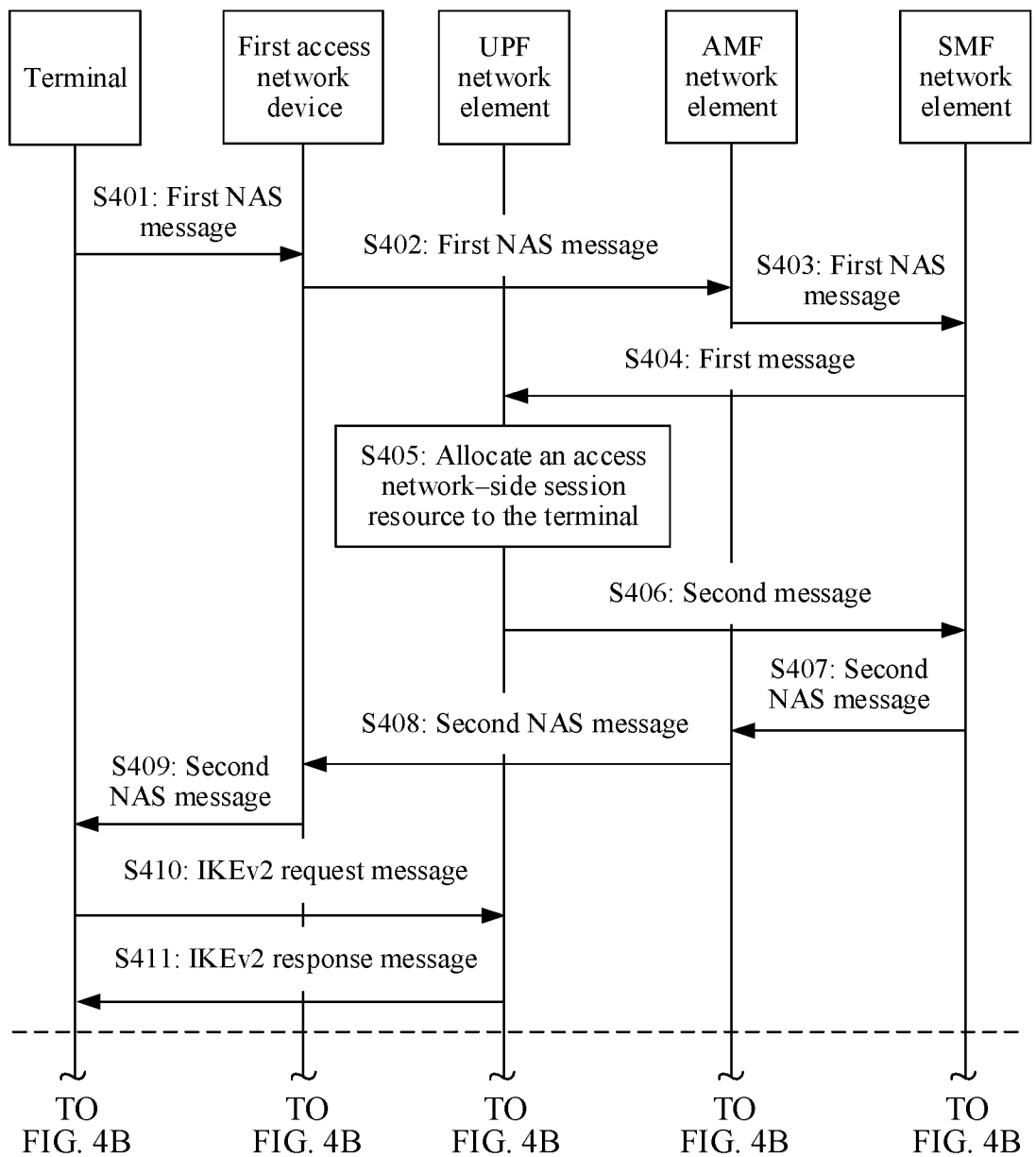
FIG. 4A and FIG. 4B are a schematic flowchart 1 of a session establishment method according to an embodiment.
Figure 4B:
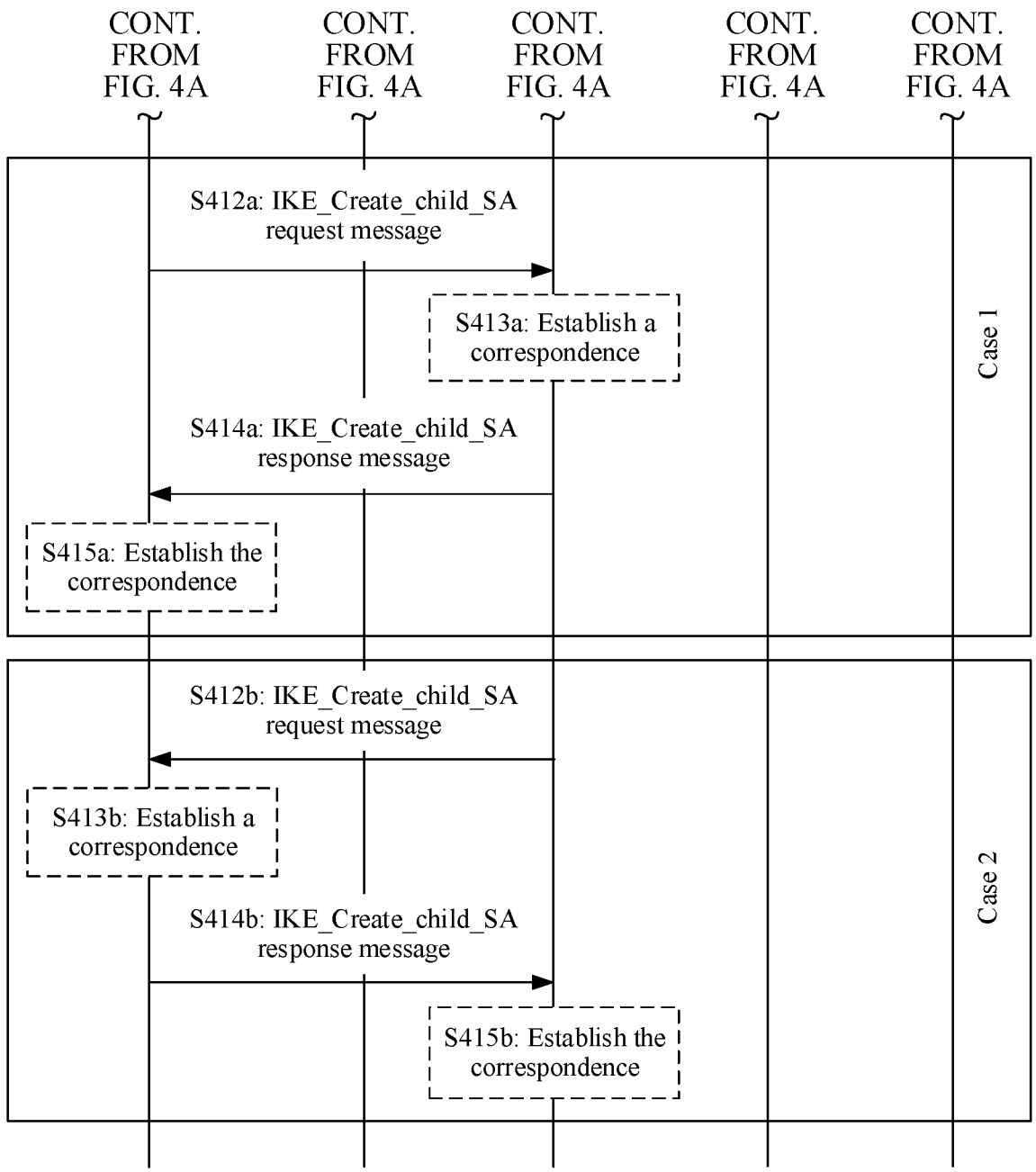

For example, the session establishment system shown in FIG. 1 is applied to the 5G network shown in FIG. 2. FIG. 4A and FIG. 4B show a session establishment method according to an embodiment. The session establishment method includes the following steps.

S401: A terminal sends a first NAS message to a first access network device, and the first access network device receives the first NAS message from the terminal, where the first NAS message is used to request to establish a session.

In some embodiments, if session establishment in this embodiment refers to the foregoing establishment of a new session, the first NAS message may be, for example, a PDU session establishment request (PDU session establishment request) message. Alternatively, if session establishment in this embodiment refers to the foregoing session resumption or session update, the first NAS message may be, for example, a PDU session update request message. This is not specifically limited in this embodiment.

In some embodiments, the first NAS message may carry a terminal identifier. The terminal identifier may be, for example, a media access control (MAC) address of the terminal or an international mobile subscriber identity (IMSI) of the terminal, and is used by a UPF network element to identify the terminal subsequently. This is not specifically limited in this embodiment.

In some embodiments, the first NAS message may further carry first indication information. The first indication information is used by the terminal to request to establish the session by using a second access technology. For example, in this embodiment, if a first access technology corresponding to the first access network device is a 3GPP access technology, a long term evolution (LTE) access technology, or a 5G RAN access technology, the first indication information may be, for example, a fixed network access (fixed access) indication, a non-3GPP access indication, or a WLAN access indication.

Certainly, the first NAS message may further carry information such as location information of the terminal and a session identifier. For details, refer to an existing implementation. Details are not described herein.

S402: The first access network device sends the first NAS message to an AMF network element, and the AMF network element receives the first NAS message from the first access network device.

S403: The AMF network element sends the first NAS message to an SMF network element, and the SMF network element receives the first NAS message from the AMF network element.

S404: After the SMF network element selects a UPF network element for the session requested by the terminal, the SMF network element sends a first message to the UPF network element, and the UPF network element receives the first message from the SMF network element.

In some embodiments, the first message in this embodiment may be, for example, an N4 session establishment request. This is not specifically limited in this embodiment.

In some embodiments, the SMF network element may select an appropriate UPF based on a data network name (DNN) or a session and service continuity (SSC) mode in the first NAS message. For details, refer to an existing implementation. Details are not described herein.

In some embodiments, the SMF network element may select, based on at least one of the location information of the terminal, information about the UPF network element, or the first indication information, the UPF network element for the session requested by the terminal. For a related description of the first indication information, refer to step S401. Details are not described herein.

In some embodiments, the information about the UPF network element may be obtained from local configuration information of the SMF network element. Alternatively, the information about the UPF network element may be obtained by the SMF network element from another network element, for example, may be obtained by the SMF network element by querying a domain name system (DNS). Alternatively, the information about the UPF network element may be dynamically reported by the UPF network element to the SMF network element. This is not specifically limited in this embodiment.

In some embodiments, the information about the UPF network element may include, for example, at least one of a service area of the UPF network element, an access network type supported by the UPF network element, or an interface type supported by the UPF network element. This is not specifically limited in this embodiment.

For example, the SMF network element may determine, based on the location information of the terminal, a UPF network element closest to the terminal as the UPF network element selected for the session. Alternatively, the SMF network element may determine, based on the service area of the UPF network element when the terminal is within a service area of a UPF network element, the UPF network element as the UPF network element selected for the session. Alternatively, the SMF network element may determine, based on the first indication information or at least one of the access network type supported by the UPF network element or the interface type supported by the UPF network element, a UPF network element that supports the second access technology or a second access technology interface as the UPF network element selected for the session.

In some embodiments, the first message may carry the session identifier, quality of service (QoS) parameters and service flow description information that are related to the session, and the like. For details, refer to an existing implementation. Details are not described herein.

In some embodiments, after the SMF network element allows the terminal to establish the session by using the second access technology, the SMF network element may select, for the session requested by the terminal, a UPF network element that supports access of the terminal using the second access technology. This is not specifically limited in this embodiment.

For example, in this embodiment, the SMF network element may allow, based on at least one of the location information of the terminal, subscription data of the terminal, the first indication information, or a local policy, the terminal to establish the session by using the second access technology. For the related description of the first indication information, refer to step S401. Details are not described herein. For example, if there is an available second access technology at a location of the terminal, the SMF network element allows the terminal to establish the session by using the second access technology. Alternatively, if the SMF network element receives the first indication information sent by the terminal, the SMF network element allows the terminal to establish the session by using the second access technology. Alternatively, if the subscription data of the terminal includes an indication that the terminal is allowed to establish the session by using the second access technology, the SMF network element allows the terminal to establish the session by using the second access technology. Alternatively, if the local policy of the SMF network element allows the terminal to establish the session by using the second access technology, the SMF network element allows the terminal to establish the session by using the second access technology. Alternatively, when the terminal is at a specific location, the SMF network element allows, based on the subscription data of the terminal and the location information of the terminal, the terminal to establish the session by using the second access technology.

S405: The UPF network element allocates an access network-side session resource to the terminal based on the first message.

In some embodiments, in this embodiment, the access network-side session resource allocated to the terminal may be, for example, a tunnel identifier that is on the UPF network element side and is of an N9 tunnel between the UPF network element and another UPF network element. The tunnel identifier may include, for example, an endpoint address or an endpoint identifier. The endpoint identifier may be, for example, a tunnel endpoint identifier (TEID). This is not specifically limited in this embodiment.

S406: The UPF network element sends a second message to the SMF network element, and the SMF network element receives the second message from the UPF network element.

In some embodiments, the second message in this embodiment may be, for example, an N4 session establishment response. This is not specifically limited in this embodiment.

The second message may carry the access network-side session resource allocated by the UPF network element to the terminal. For details, refer to an existing implementation. Details are not described herein.

In some embodiments, the second message may further carry at least one of a terminal identifier or an identifier of the UPF network element. This is not specifically limited in this embodiment.

The terminal identifier may be, for example, a temporary identifier allocated by the UPF network element to the terminal, and the temporary identifier is used by the UPF network element to identify the terminal. The identifier of the UPF network element may be, for example, an IP address, a fully qualified domain name (FQDN) identifier, or another logical identifier of the UPF network element. This is not specifically limited in this embodiment.

S407: The SMF network element sends a second NAS message to the AMF network element, and the AMF network element receives the second NAS message from the SMF network element.

The second NAS message carries the identifier of the UPF network element.

In some embodiments, if the first NAS message is the PDU session establishment request, the second NAS message may be, for example, a PDU session establishment accept (PDU session establishment accept) message. If the first NAS message is the PDU session update request, the second NAS message may be, for example, a PDU session update accept (PDU session update accept) message. This is not specifically limited in this embodiment.

In some embodiments, if the second message in step S406 carries the terminal identifier, the second NAS message may further carry the terminal identifier. This is not specifically limited in this embodiment.

In some embodiments, the second NAS message may further carry second indication information. The second indication information is used to indicate a session establishment procedure between the terminal and the UPF network element to be initiated by using the second access technology. For example, in this embodiment, the second indication information may be an access technology indication. The access technology indication may be, for example, a radio access technology (RAT) indication or a fixed network access technology indication. The RAT may be, for example, an LTE access technology or a WLAN access technology. A general description is provided herein. This is not specifically limited in this embodiment.

For example, if the first access technology corresponding to the first access network device is the 3GPP access technology, the LTE access technology, or the 5G RAN access technology, the second indication information may be a fixed network access indication, a non-3GPP access indication, or a WLAN access indication.

Certainly, the second NAS message may further carry other information such as the session identifier. For details, refer to an existing implementation. Details are not described in this embodiment.

S408: The AMF network element sends the second NAS message to the first access network device, and the first access network device receives the second NAS message from the AMF network element.

S409: The first access network device sends the second NAS message to the terminal, and the terminal receives the second NAS message from the first access network device.

In some embodiments, if the identifier of the UPF network element is the IP address of the UPF network element, as shown in FIG. 4A and FIG. 4B, the session establishment method provided in this embodiment further includes the following steps.

S410: The terminal sends an internet key exchange protocol version 2 (IKEv2) request message to the UPF network element based on the IP address of the UPF network element by using the second access technology, where the IKEv2 request message is used to establish an IP security (IPSec) connection between the terminal and the UPF network element.

In some embodiments, the IKEv2 request message may be, for example, an internet key exchange protocol authentication (IKE_AUTH) request message. This is not specifically limited in this embodiment.

S411: The UPF network element sends an IKEv2 response message to the terminal, and the terminal receives the IKEv2 response message from the UPF network element.

In some embodiments, if the IKEv2 request message in step S410 is the IKE_AUTH request message, the IKEv2 response message may be, for example, an IKE_AUTH response message. The IKE_AUTH response message may carry an AUTH value, an extensible authentication protocol (EAP) message, or the like, and the IKE_AUTH response message is used to complete authentication between the terminal and a network side. This is not specifically limited in this embodiment.

In some embodiments, if one session corresponds to a plurality of resources, as shown in Case 1 of FIG. 4A and FIG. 4B, the session establishment method provided in this embodiment further includes the following steps.

S412a: The terminal sends an IKE_Create (Create)_Child (child)_Security Association (security association, SA) request message to the UPF network element, and the UPF network element receives the IKE_Create_child_SA request message from the terminal.

The IKE_Create_child_SA request message carries a first identifier of a child SA allocated by the terminal to the child SA and a session identifier corresponding to the first identifier of the child SA. The first identifier of the child SA may be, for example, a security parameter index (SPI) parameter. The first identifier of the child SA may be carried in an IKE message header, an SA payload (payload), or a notify payload (notify payload). The session identifier may be carried in a notify payload. For details, refer to an existing implementation. Details are not described herein.

S413a: The UPF network element allocates a second identifier of the child SA to the child SA based on the IKE_Create_child_SA request message, and establishes a correspondence between the session identifier and at least one of the first identifier of the child SA or the second identifier of the child SA.

In this way, in a subsequent data transmission process, after receiving a data packet from the terminal, the UPF network element may determine, based on a first identifier of a child SA carried in the data packet and a correspondence between a session identifier and a first identifier of a child SA, a session identifier corresponding to the data packet, to perform data transmission on a session resource corresponding to the session identifier. Alternatively, in a subsequent data transmission process, after receiving a data packet from the terminal, the UPF network element may determine, based on a second identifier of a child SA carried in the data packet and a correspondence between a session identifier and a second identifier of a child SA, a session identifier corresponding to the data packet, to perform data transmission on a session resource corresponding to the session identifier. This is not specifically limited in this embodiment.

S414a: The UPF sends an IKE_Create_child_SA response message to the terminal, and the terminal receives the IKE_Create_child_SA response message from the UPF network element.

The IKE_Create_child_SA response message may carry the second identifier of the child SA. The second identifier of the child SA may be, for example, a SPI parameter, and may be carried in an IKE message header, an SA payload, or a notify payload. This is not specifically limited in this embodiment.

S415a: The terminal establishes the correspondence between the session identifier and the at least one of the first identifier of the child SA or the second identifier of the child SA.

In this way, in the subsequent data transmission process, the terminal may perform, based on the correspondence between the session identifier and the at least one of the first identifier of the child SA or the second identifier of the child SA, data transmission over a corresponding child SA. This is not specifically limited in this embodiment.

In some embodiments, if the IKE_Create_child SA response message in step S414a carries a QoS profile that is related to the session, the terminal further needs to store the QoS profile that is related to the session. This is not specifically limited in this embodiment.

In some embodiments, steps S412a to S415a are described by using an example in which the terminal initiates an SA establishment procedure. Certainly, the UPF network element may also initiate the SA establishment procedure. As shown in Case 2 of FIG. 4A and FIG. 4B, the session establishment method in this embodiment includes the following steps.

S412b: The UPF network element sends an IKE_Create_Child_SA request message to the terminal, and the terminal receives the IKE_Create_Child_SA request message from the UPF network element.

The IKE_Create_Child_SA request message carries a second identifier of a child SA allocated by the UPF network element to the child SA and a session identifier corresponding to the second identifier of the child SA. The second identifier of the child SA may be, for example, a SPI parameter. The second identifier of the child SA may be carried in an IKE message header, an SA payload, or a notify payload. The session identifier may be carried in a notify payload. For details, refer to an existing implementation. Details are not described herein.

S413b: The terminal allocates a first identifier of the child SA to the child SA based on the IKE_Create_Child_SA request message, and establishes a correspondence between the session identifier and at least one of the first identifier of the child SA or the second identifier of the child SA.

In this way, in a subsequent data transmission process, the terminal may perform, based on the correspondence between the session identifier and the at least one of the first identifier of the child SA or the second identifier of the child SA, data transmission over a corresponding child SA. This is not specifically limited in this embodiment.

In some embodiments, if the IKE_Create_Child_SA request message in step S412b carries a QoS profile that is related to the session, the terminal further needs to store the QoS profile that is related to the session. This is not specifically limited in this embodiment.

S414b: The terminal sends an IKE_Create_child_SA response message to the UPF network element, and the UPF network element receives the IKE_Create_child_SA response message from the terminal.

The IKE_Create_child_SA response message may carry the first identifier of the child SA. The first identifier of the child SA may be, for example, a SPI parameter, and may be carried in an IKE message header, an SA payload, or a notify payload. This is not specifically limited in this embodiment.

S415b: The UPF network element establishes the correspondence between the session identifier and the at least one of the first identifier of the child SA or the second identifier of the child SA.

For a related description of step S415b, refer to step S413a. Details are not described herein.

It should be noted that, in steps S412a to S415a or steps S412b to S415b, a manner of establishing one child SA is merely described as an example. When a plurality of child SAs need to be established, for a manner of establishing each child SA, refer to steps S412a to S415a or steps S412b to S415b. Details are not described in this embodiment.

It should be noted that, steps S410 to S415a or steps S410 to S415b are described by merely using an example in which the identifier of the UPF network element is the IP address of the UPF network element. Certainly, as described above, the identifier of the UPF network element may alternatively be the FQDN identifier of the UPF network element. In this case, the terminal needs to first obtain the IP address of the UPF network element based on the FQDN identifier of the UPF network element, and then establish the session by performing steps S410 to S415a or steps S410 to S415b. Details are not described in this embodiment. The terminal may obtain, based on the FQDN identifier of the UPF network element, the IP address of the UPF network element by querying a domain name system (DNS) or in another manner. This is not specifically limited in this embodiment.

According to the session establishment method provided in this embodiment, a NAS message transfer function can be separated from a session user plane establishment function. Therefore, more diversified services can be provided for the terminal.

Actions of the terminal or the SMF network element in steps S401 to S415a or in steps S401 to S415b may be performed by the processor 301 in the communications device 300 shown in FIG. 3 by invoking the application program code stored in the memory 303. This is not limited in this embodiment.

Figure 5:
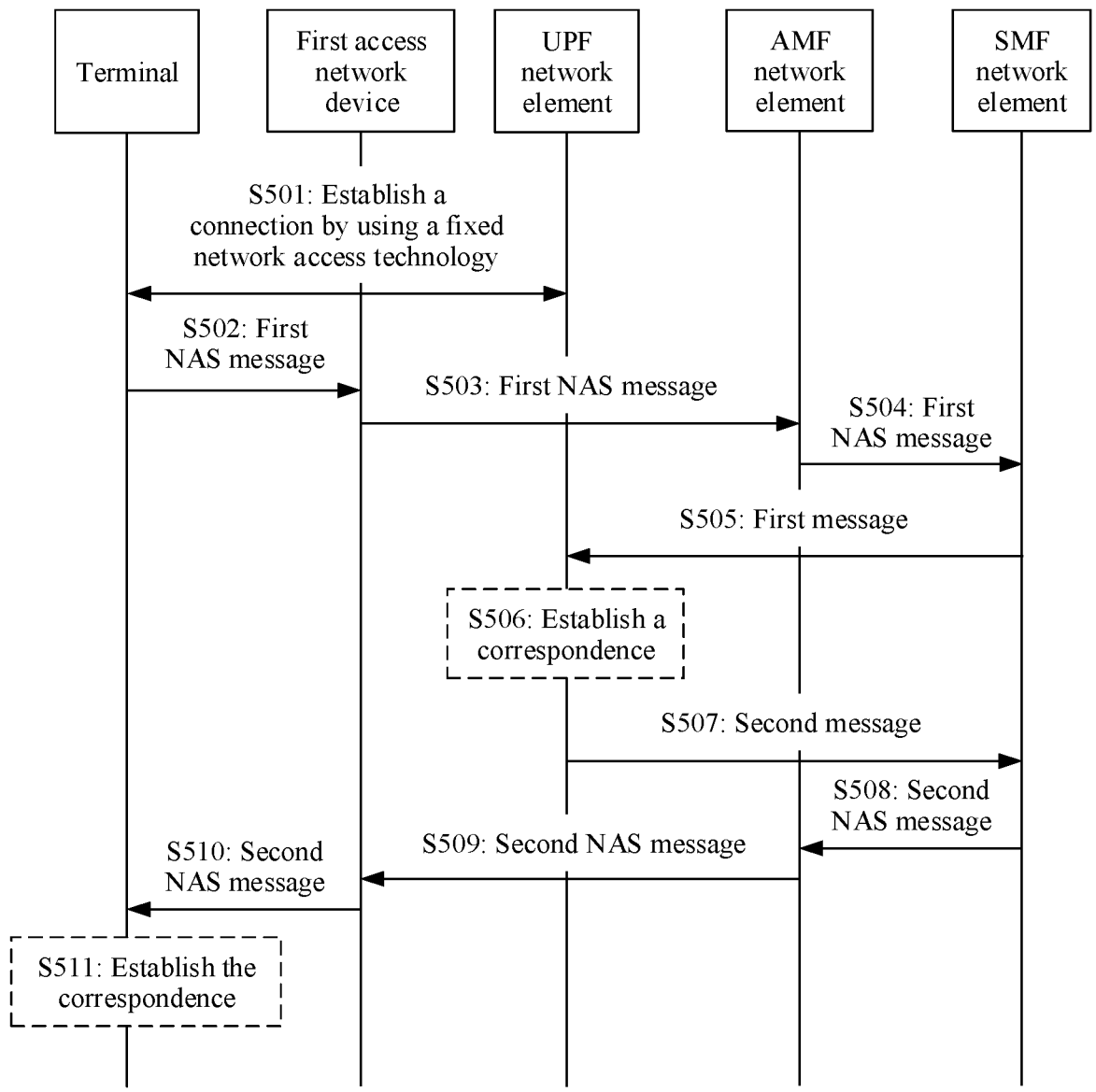
FIG. 5 is a schematic flowchart 2 of a session establishment method according to an embodiment.

In some embodiments, for example, the session establishment system shown in FIG. 1 is applied to the 5G network shown in FIG. 2. FIG. 5 shows another session establishment method according to an embodiment. The session establishment method includes the following steps.

S501: A terminal establishes a connection to a UPF network element by using a second access technology.

For a specific implementation in which the terminal establishes a connection to the UPF network element by using an access technology, refer to an existing implementation. Details are not described herein.

In this embodiment, in a process in which the terminal establishes the connection to the UPF network element by using the second access technology, the terminal may obtain an identifier of the UPF network element. The identifier of the UPF network element may be, for example, an IP address, an FQDN identifier, or another logical identifier of the UPF network element. This is not specifically limited in this embodiment.

S502 to S504: Similar to steps S401 to S403. An only difference lies in that, a first NAS message in this embodiment carries the identifier of the UPF network element in step S501. The identifier of the UPF network element is used by the terminal to establish a session by using the UPF network element.

S505: After an SMF network element selects, based on the identifier of the UPF network element, the UPF network element corresponding to the identifier of the UPF network element for the session requested by the terminal, the SMF network element sends a first message to the UPF network element, and the UPF network element receives the first message from the SMF network element.

In some embodiments, for example, an N4 session establishment request. This is not specifically limited in this embodiment.

In some embodiments, the first message may carry a session identifier, QoS parameters and service flow description information that are related to the session, and the like. For details, refer to an existing implementation. Details are not described herein.

In some embodiments, in this embodiment, after the SMF network element allows the terminal to establish the session by using the second access technology, the SMF network element may select, based on the identifier of the UPF network element, the corresponding UPF network element for the session requested by the terminal. For a specific implementation in which the SMF network element allows the terminal to establish the session by using the second access technology, refer to the embodiment shown in FIG. 4A and FIG. 4B. Details are not described herein.

S506: After allocating a session resource to the terminal based on the first message, the UPF network element establishes a correspondence between a resource identifier and the session identifier.

The session resource in this embodiment includes a session resource between the terminal and the UPF network element, and the network-side session resource described in FIG. 4A and FIG. 4B. This is not specifically limited in this embodiment.

It should be noted that, the resource identifier in this embodiment is an identifier of the session resource between the terminal and the UPF network element, and is used by the UPF network element to identify the session. A general description is provided herein, and details are not described below again.

In this way, in a subsequent data transmission process, after receiving a data packet from the terminal, the UPF network element may determine, based on a resource identifier carried in the data packet and a correspondence between a session identifier and a resource identifier, a session identifier corresponding to the data packet, to perform data transmission on a session resource corresponding to the session identifier. This is not specifically limited in this embodiment.

In some embodiments, the resource identifier may be, for example, a virtual local area network (VLAN) identifier or an identifier of a child SA. This is not specifically limited in this embodiment.

In some embodiments, when one session corresponds to only one resource, the session identifier may be used as a resource identifier. In this case, the UPF network element does not need to establish the correspondence between the resource identifier and the session identifier. A general description is provided herein, and details are not described below again.

S507: The UPF network element sends a second message to the SMF network element, and the SMF network element receives the second message from the UPF network element.

In some embodiments, the second message in this embodiment may be, for example, an N4 session establishment response.

In some embodiments, the second message may carry an access network-side session resource allocated by the UPF network element to the terminal. For details, refer to an existing implementation. Details are not described herein.

In some embodiments, the second message may further carry at least one of a terminal identifier, the identifier of the UPF network element, and the resource identifier. For related descriptions of the terminal identifier, the identifier of the UPF network element, and the resource identifier, refer to the foregoing embodiment. Details are not described herein.

S508: The SMF network element sends a second NAS message to an AMF network element, and the AMF network element receives the second NAS message from the SMF network element.

The second NAS message carries the at least one of the terminal identifier, the identifier of the UPF network element, and the resource identifier that are carried in the second message.

In some embodiments, if the first NAS message is a PDU session establishment request, the second NAS message may be, for example, a PDU session establishment accept message. If the first NAS message is a PDU session update request, the second NAS message may be, for example, a PDU session update accept message. This is not specifically limited in this embodiment.

In some embodiments, the second NAS message may further carry indication information. The indication information is used to indicate the session to be established by using the UPF network element accessed using the second access technology. For example, in this embodiment, the indication information may be, for example, an access technology indication. For a related description of the access technology indication, refer to step S407. Details are not described herein.

For example, if a first access technology corresponding to a first access network device is a 3GPP access technology, an LTE access technology, or a 5G RAN access technology, the indication information may be a fixed network access indication, a non-3GPP access indication, or a WLAN access indication.

Certainly, the second NAS message may further carry other information such as the session identifier. For details, refer to an existing implementation. Details are not described in this embodiment.

S509: The AMF network element sends the second NAS message to the first access network device, and the first access network device receives the second NAS message from the AMF network element.

S510: The first access network device sends the second NAS message to the terminal, and the terminal receives the second NAS message from the first access network device.

S511: The terminal establishes the correspondence between the resource identifier and the session identifier.

In this way, in the subsequent data transmission process, the terminal may perform, based on the correspondence between the session identifier and the resource identifier, data transmission on a resource corresponding to a specific resource identifier. This is not specifically limited in this embodiment.

In some embodiments, when one session corresponds to only one resource, the session identifier may be used as a resource identifier. In this case, step S511 may be skipped. A general description is provided herein, and details are not described below again.

According to the session establishment method provided in this embodiment, a NAS message transfer function can be separated from a session user plane establishment function. Therefore, more diversified services can be provided for the terminal.

Actions of the terminal or the SMF network element in steps S501 to S511 may be performed by the processor 301 in the communications device 300 shown in FIG. 3 by invoking the application program code stored in the memory 303. This is not limited in this embodiment.

Figure 6:
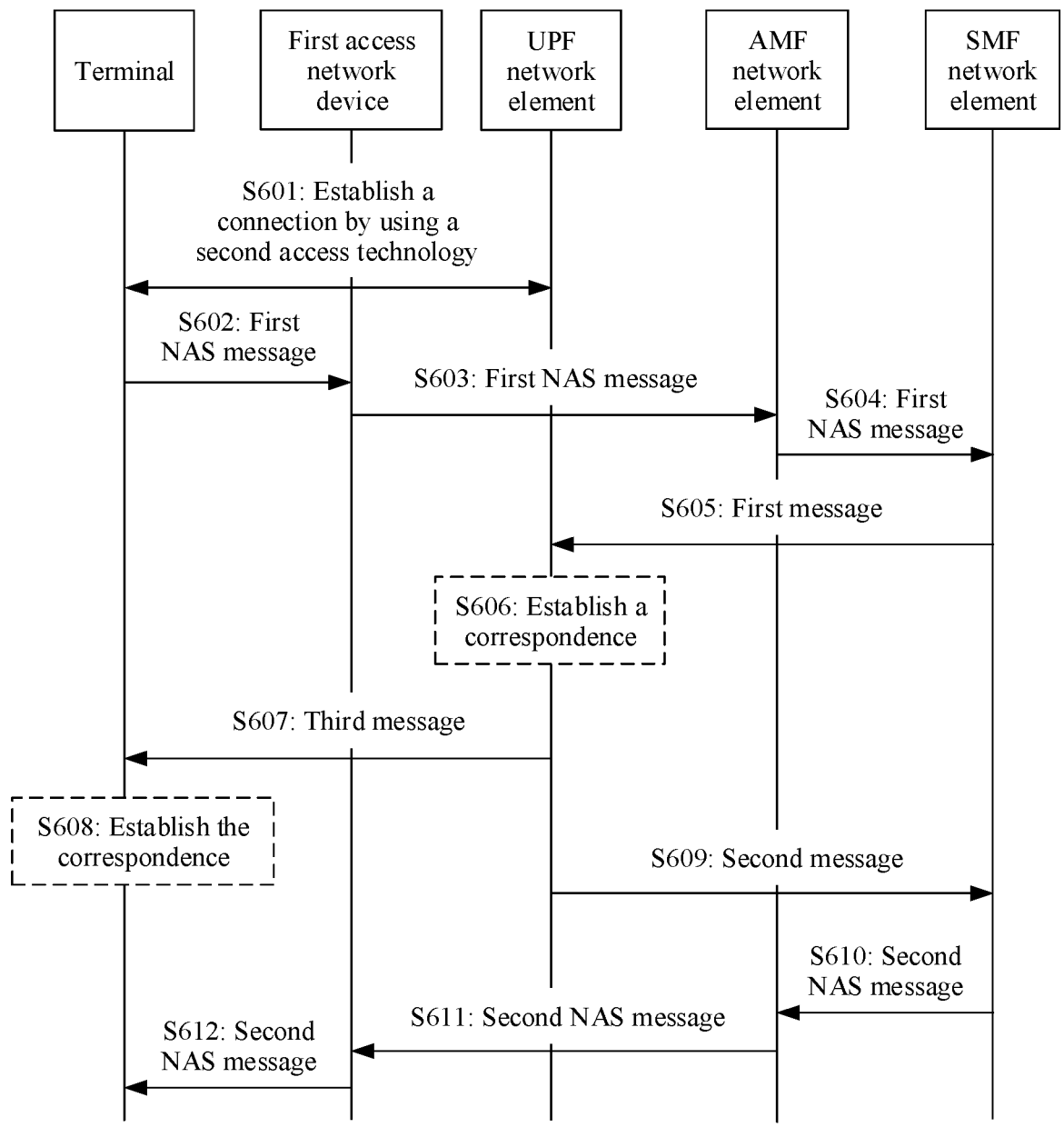
FIG. 6 is a schematic flowchart 3 of a session establishment method according to an embodiment.

In some embodiments, for example, the session establishment system shown in FIG. 1 is applied to the 5G network shown in FIG. 2. FIG. 6 shows still another session establishment method according to an embodiment. The session establishment method includes the following steps.

S606 to S606: Same as steps S501 to S506. For details, refer to the embodiment shown in FIG. 5. Details are not described herein.

S607: A UPF network element sends a third message to a terminal, and the terminal receives the third message from the UPF network element.

In some embodiments, the third message may be, for example, an IKE_AUTH request message, an IKE_AUTH response message, an IKE_Create_Child_SA request message, or an IKE_Create_Child_SA response message. This is not specifically limited in this embodiment.

The third message may carry at least one of a terminal identifier, an identifier of the UPF network element, and a resource identifier. For related descriptions of the terminal identifier, the identifier of the UPF network element, and the resource identifier, refer to the foregoing embodiments. Details are not described herein.

S608: The terminal establishes a correspondence between the resource identifier and a session identifier.

For a related description of step S608, refer to step S511. Details are not described herein.

S609 to S612: Similar to steps S507 to S510. An only difference lies in that, in this embodiment, because the third message carries the at least one of the terminal identifier, the identifier of the UPF network element, and the resource identifier, a second message and a second NAS message do not carry the at least one of the terminal identifier, the identifier of the UPF network element, and the resource identifier that need to be carried in the second message and the second NAS message in the embodiment shown in FIG. 5. For related descriptions, refer to the embodiment shown in FIG. 5. Details are not described herein.

According to the session establishment method provided in this embodiment, a NAS message transfer function can be separated from a session user plane establishment function. Therefore, more diversified services can be provided for the terminal.

Actions of the terminal or an SMF network element in steps S601 to S612 may be performed by the processor 301 in the communications device 300 shown in FIG. 3 by invoking the application program code stored in the memory 303. This is not limited in this embodiment.

The foregoing mainly describes the solutions provided in the embodiments of this application from a perspective of interaction between the network elements. It may be understood that, to implement the foregoing functions, the terminal or the session management network element includes corresponding hardware structures and/or software modules for performing the functions. A person skilled in the art should be easily aware that, in combination with the examples described in the embodiments disclosed in this specification, units and algorithms steps can be implemented by hardware or a combination of hardware and computer software in this application. Whether a function is performed by hardware or hardware driven by computer software depends on particular applications and design constraints of the technical solutions. The person skilled in the art may use different methods to implement the described functions for each particular application, but it should not be considered that the implementation goes beyond the scope of this application.

In various embodiments, the terminal or the session management network element may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. In actual implementation, another division manner may be used.

Figure 7:
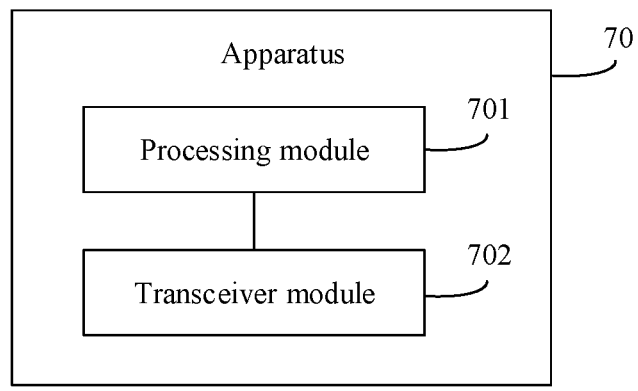
FIG. 7 is a schematic structural diagram 1 of an apparatus according to an embodiment.

For example, when functional modules are obtained through division in an integrated manner, FIG. 7 is a schematic structural diagram of an apparatus 70. The apparatus 70 may be the terminal in the foregoing embodiments, or may be a chip or circuit in the terminal in the foregoing embodiments. This is not specifically limited in this embodiment. The apparatus 70 includes a processing module 701 and a transceiver module 702. The transceiver module 702 is configured to send a first NAS message to a first access network device corresponding to a first access technology, where the first NAS message is used to request to establish a session. The transceiver module 702 is further configured to receive a second NAS message from the first access network device, where the second NAS message carries an identifier of a user plane function network element. The processing module 701 is configured to initiate a session establishment procedure between the terminal and the user plane function network element based on the identifier of the user plane function network element by using a second access technology.

In some embodiments, the identifier of the user plane function network element includes an IP address or FQDN identifier of the user plane function network element. The processing module 701 is specifically configured to send a request message to the user plane function network element based on the IP address or the FQDN identifier of the user plane function network element by using the second access technology, where the request message is used to establish an IPsec connection between the terminal and the user plane function network element.

All related content of the steps in the foregoing method embodiments may be cited in function descriptions of corresponding functional modules. Details are not described herein.

In this embodiment, the apparatus 70 is presented in a form of functional modules obtained through division in an integrated manner. The "module" herein may be an application-specific integrated circuit ASIC, a processor and a memory that execute one or more software or firmware programs, an integrated logic circuit, and/or another device that can provide the foregoing functions.

In a simple embodiment, a person skilled in the art may figure out that the apparatus 70 may be in the form shown in FIG. 3.

For example, the processor 301 in FIG. 3 may invoke the computer-executable instruction stored in the memory 303, to enable the apparatus 70 to perform the session establishment method in the foregoing method embodiments.

For example, functions/implementation processes of the transceiver module 702 and the processing module 701 in FIG. 7 may be implemented by the processor 301 in FIG. 3 by invoking the computer-executable instruction stored in the memory 303. Alternatively, a function/an implementation process of the processing module 701 in FIG. 7 may be implemented by the processor 301 in FIG. 3 by invoking the computer-executable instruction stored in the memory 303, and a function/an implementation process of the transceiver module 702 in FIG. 7 may be implemented by the communications interface 303 in FIG. 3.

In some embodiments, when the apparatus 70 is the chip or circuit, the function/implementation process of the transceiver module 702 may alternatively be implemented by using a pin, a circuit, or the like. In some embodiments, when the apparatus 70 is the chip or circuit, the memory 303 may be a storage unit in the chip or circuit, for example, a register or a cache. Certainly, when the apparatus 70 is the terminal, the memory 303 may be a storage unit that is located outside a chip and that is in the terminal. This is not specifically limited in the embodiments of this application.

The apparatus provided in this embodiment may be configured to perform the foregoing session establishment method. Therefore, for a technical effect that can be achieved by the apparatus, refer to the foregoing method embodiments. Details are not described herein.

Figure 8:
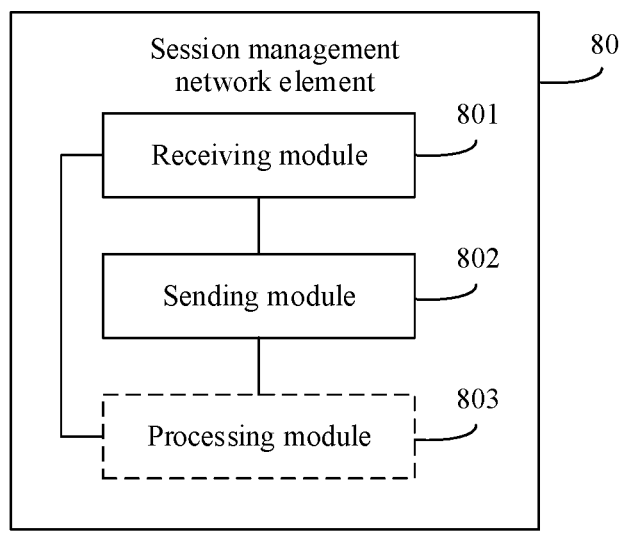
FIG. 8 is a schematic structural diagram 1 of a session management network element according to an embodiment.

For example, when functional modules are obtained through division in an integrated manner, FIG. 8 is a schematic structural diagram of a session management network element 80. The session management network element 80 includes a receiving module 801 and a sending module 802. The receiving module 801 is configured to receive a first NAS message from a first access network device corresponding to a first access technology, where the first NAS message is used to request to establish a session. The sending module 802 is configured to send a second NAS message to the first access network device, where the second NAS message carries an identifier of a user plane function network element, and the identifier of the user plane function network element is used to indicate a terminal to establish the session by using the user plane function network element.

In some embodiments, as shown in FIG. 8, the session management network element 80 further includes a processing module 803. The processing module 803 is configured to obtain at least one of location information of the terminal, subscription data of the terminal, first indication information, or a local policy, where the first indication information is used by the terminal to request to establish the session by using a second access technology. The processing module 803 is further configured to allow, based on the at least one of the location information of the terminal, the subscription data of the terminal, the first indication information, or the local policy, the terminal to establish the session by using the second access technology.

In some embodiments, the processing module 803 is further configured to select, for the session based on at least one of the location information of the terminal, information about the user plane function network element, or the first indication information, the user plane function network element that supports access using the second access technology.

All related content of the steps in the foregoing method embodiments may be cited in function descriptions of corresponding functional modules. Details are not described herein.

In this embodiment, the session management network element 80 is presented in a form of functional modules obtained through division in an integrated manner. The "module" herein may be an application-specific integrated circuit ASIC, a processor and a memory that execute one or more software or firmware programs, an integrated logic circuit, and/or another device that can provide the foregoing functions. In a simple embodiment, a person skilled in the art may figure out that the session management network element 80 may be in the form shown in FIG. 3.

For example, the processor 301 in FIG. 3 may invoke the computer-executable instruction stored in the memory 303, to enable the session management network element 80 to perform the session establishment method in the foregoing method embodiments.

For example, functions/implementation processes of the receiving module 801, the sending module 802, and the processing module 803 in FIG. 8 may be implemented by the processor 301 in FIG. 3 by invoking the computer-executable instruction stored in the memory 303. Alternatively, a function/an implementation process of the processing module 803 in FIG. 8 may be implemented by the processor 301 in FIG. 3 by invoking the computer-executable instruction stored in the memory 303, and functions/implementation processes of the receiving module 801 and the sending module 802 in FIG. 8 may be implemented by the communications interface 303 in FIG. 3.

The session management network element provided in this embodiment may perform the foregoing session establishment method. Therefore, for a technical effect that can be achieved by the session management network element, refer to the foregoing method embodiments. Details are not described herein.

In some embodiments, a chip system is provided. The chip system includes a processor, configured to support the session management network element in implementing the foregoing session establishment method, for example, obtaining the at least one of the location information of the terminal, the subscription data of the terminal, the first indication information, or the local policy. In a possible design, the chip system further includes a memory. The memory is configured to store a program instruction and data that are necessary for the session management network element. Certainly, alternatively, the memory may not be in the chip system. The chip system may include a chip, or may include a chip and another discrete device. This is not specifically limited in this embodiment.

Figure 9:
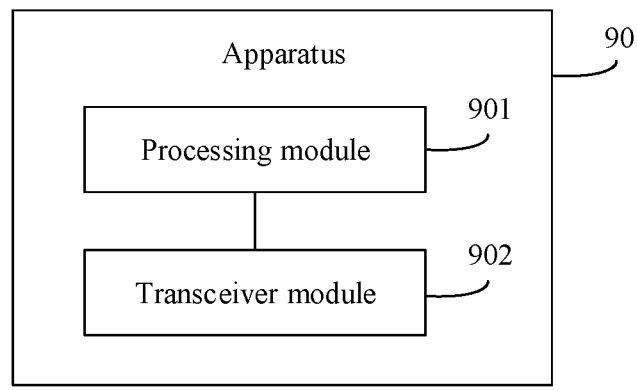
FIG. 9 is a schematic structural diagram 2 of an apparatus according to an embodiment.

For example, when functional modules are obtained through division in an integrated manner, FIG. 9 is a schematic structural diagram of an apparatus 90. The apparatus 90 may be the terminal in the foregoing embodiments, or may be a chip or circuit in the terminal in the foregoing embodiments. This is not limited in this embodiment. The apparatus 90 includes a processing module 901 and a transceiver module 902. The processing module 901 is configured to: in a process in which the terminal establishes a connection to a user plane function network element by using a second access technology, obtain an identifier of the user plane function network element. The transceiver module 902 is configured to send a first NAS message to a first access network device corresponding to a first access technology, where the first NAS message carries the identifier of the user plane function network element, and the identifier of the user plane function network element is used by the terminal to establish a session by using the user plane function network element.

In some embodiments, the transceiver module 902 is further configured to receive a second NAS message from the first access network device, where the second NAS message carries a resource identifier corresponding to the session, and the resource identifier is used by the user plane function network element to identify the session.

In some embodiments, the transceiver module 902 is further configured to receive a resource identifier corresponding to the session from the user plane function network element, where the resource identifier is used by the user plane function network element to identify the session. The transceiver module 902 is further configured to receive a second NAS message from the first access network device.

In some embodiments, the processing module 901 is further configured to obtain a terminal identifier, where the terminal identifier is used by the user plane function network element to identify the terminal.

All related content of the steps in the foregoing method embodiments may be cited in function descriptions of corresponding functional modules. Details are not described herein.

In this embodiment, the apparatus 90 is presented in a form of functional modules obtained through division in an integrated manner. The "module" herein may be an application-specific integrated circuit ASIC, a processor and a memory that execute one or more software or firmware programs, an integrated logic circuit, and/or another device that can provide the foregoing functions.

In a simple embodiment, a person skilled in the art may figure out that the apparatus 90 may be in the form shown in FIG. 3.

For example, the processor 301 in FIG. 3 may invoke the computer-executable instruction stored in the memory 303, to enable the apparatus 90 to perform the session establishment method in the foregoing method embodiments.

In some embodiments, functions/implementation processes of the transceiver module 902 and the processing module 901 in FIG. 9 may be implemented by the processor 301 in FIG. 3 by invoking the computer executable instruction stored in the memory 303. Alternatively, a function/an implementation process of the processing module 901 in FIG. 9 may be implemented by the processor 301 in FIG. 3 by invoking the computer-executable instruction stored in the memory 303, and a function/an implementation process of the transceiver module 902 in FIG. 9 may be implemented by the communications interface 303 in FIG. 3.

In some embodiments, when the apparatus 90 is the chip or circuit, the function/implementation process of the transceiver module 902 may alternatively be implemented by using a pin, a circuit, or the like. In some embodiments, when the apparatus 90 is the chip or circuit, the memory 303 may be a storage unit in the chip or circuit, for example, a register or a cache. Certainly, when the apparatus 90 is the terminal, the memory 303 may be a storage unit that is located outside a chip and that is in the terminal. This is not specifically limited in the embodiments of this application.

The apparatus provided in this embodiment may be configured to perform the foregoing session establishment method. Therefore, for a technical effect that can be achieved by the apparatus, refer to the foregoing method embodiments. Details are not described herein.

Figure 10:
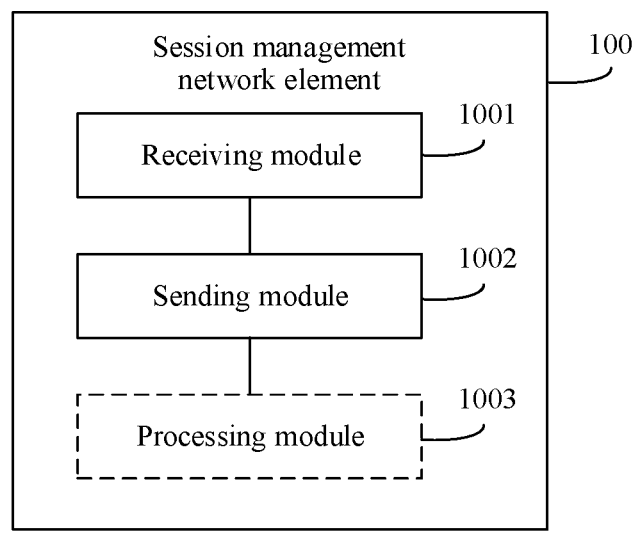
FIG. 10 is a schematic structural diagram 2 of a session management network element according to an embodiment.

For example, when functional modules are obtained through division in an integrated manner, FIG. 10 is a schematic structural diagram of a session management network element 100. The session management network element 100 includes a receiving module 1001 and a sending module 1002. The receiving module 1001 is configured to receive a first NAS message from a first access network device corresponding to a first access technology, where the first NAS message carries an identifier of a user plane function network element accessed by a terminal using a second access technology. The sending module 1002 is configured to send a first message to the user plane function network element, where the first message is used to request to establish a session by using the user plane function network element corresponding to the identifier of the user plane function network element.

In some embodiments, the receiving module 1001 is further configured to receive a second message from the user plane function network element, where the second message carries at least one of a resource identifier corresponding to the session or a terminal identifier, the terminal identifier is used by the user plane function network element to identify the terminal, and the resource identifier is used by the user plane function network element to identify the session. The sending module 1002 is further configured to send a second NAS message to the first access network device, where the second NAS message carries the at least one of the resource identifier or the terminal identifier.

In some embodiments, as shown in FIG. 10, the session management network element 100 further includes a processing module 1003. The processing module 1003 is configured to select the user plane function network element for the session based on the identifier of the user plane function network element.

All related content of the steps in the foregoing method embodiments may be cited in function descriptions of corresponding functional modules. Details are not described herein.

In this embodiment, the session management network element 100 is presented in a form of functional modules obtained through division in an integrated manner. The "module" herein may be an application-specific integrated circuit ASIC, a processor and a memory that execute one or more software or firmware programs, an integrated logic circuit, and/or another device that can provide the foregoing functions. In a simple embodiment, a person skilled in the art may figure out that the session management network element 100 may be in the form shown in FIG. 3.

For example, the processor 301 in FIG. 3 may invoke the computer-executable instruction stored in the memory 303, to enable the session management network element 100 to perform the session establishment method in the foregoing method embodiments.

In some embodiments, functions/implementation processes of the receiving module 1001, the sending module 1002, and the processing module 1003 in FIG. 10 may be implemented by the processor 301 in FIG. 3 by invoking the computer-executable instruction stored in the memory 303. Alternatively, a function/an implementation process of the processing module 1003 in FIG. 10 may be implemented by the processor 301 in FIG. 3 by invoking the computer-executable instruction stored in the memory 303, and functions/implementation processes of the receiving module 1001 and the sending module 1002 in FIG. 10 may be implemented by the communications interface 303 in FIG. 3.

The session management network element provided in this embodiment may perform the foregoing session establishment method. Therefore, for a technical effect that can be achieved by the session management network element, refer to the foregoing method embodiments. Details are not described herein.

In some embodiments, an embodiment provides a chip system. The chip system includes a processor, configured to support the session management network element in implementing the foregoing session establishment method, for example, selecting the user plane function network element for the session based on the identifier of the user plane function network element. In a possible design, the chip system further includes a memory. The memory is configured to store a program instruction and data that are necessary for the session management network element. Certainly, alternatively, the memory may not be in the chip system. The chip system may include a chip, or may include a chip and another discrete device. This is not specifically limited in this embodiment.

All or some of the foregoing embodiments may be implemented by software, hardware, firmware, or any combination thereof. When a software program is used to implement the embodiments, the embodiments may be all or partially implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although the present disclosure is described with reference to specific features and the embodiments thereof, it is clear that various modifications and combinations may be made to them without departing from the spirit and scope of the present disclosure. Correspondingly, the specification and accompanying drawings are merely example descriptions of this application defined by the accompanying claims, and are intended to cover any or all of modifications, variations, combinations, or equivalents within the scope of this application. It is clear that, the person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A session establishment method, wherein the method comprises:

receiving, by a session management network element, a first non-access stratum (NAS) message from a first access network device corresponding to a first access technology, wherein the first NAS message is used for requesting to establish a session for a terminal;

allowing, by the session management network element based on subscription data of the terminal, the terminal to establish the session using a second access technology;

selecting, by the session management network element, a user plane function network element that supports access using the second access technology;

sending, by the session management network element, a first message to the user plane function network element;

receiving, by the user plane function network element, the first message from the session management network element, and allocating a network-side session resource to the terminal based on the first message;

sending, by the user plane function network element, a second message to the session management network element, wherein the second message carries the network-side session resource; and receiving, by the session management network element, the second message from the user plane function network element, and sending a second NAS message to the first access network device, wherein the second NAS message comprises an identifier of the user plane function network element, and the identifier of the user plane function network element indicates to the terminal to establish the session with the user plane function network element using the second access technology.

2. The session establishment method according to claim 1, wherein the second NAS message further comprises a terminal identifier, and the terminal identifier is used by the user plane function network element to identify the terminal.

3. The session establishment method according to claim 1, wherein the method further comprising:

sending, by the first access network device, the second NAS message to the terminal, wherein the second NAS message comprises an identifier of the user plane function network element.

4. The session establishment method according to claim 3, wherein the second NAS message further comprises second indication information, and the second indication information indicates the session establishment procedure between the terminal and the user plane function network element to be initiated by using the second access technology.

5. A session establishment system, wherein the system comprises a session management network element and a user plane function network element, the session management network element is configured to:

receive a first non-access stratum (NAS) message from a first access network device corresponding to a first access technology, wherein the first NAS message is used for requesting to establish a session for a terminal; and allow, based on subscription data of the terminal, the terminal to establish the session by using a second access technology; and select, for the session, a user plane function network element that supports access using the second access technology; and send a first message to the user plane function network element, wherein the user plane function network element is configured to:

receive the first message, and allocate a network-side session resource to the terminal based on the first message; and send a second message to the session management network element, wherein the second message carries the network-side session resource;

receive the second message, and send a second NAS message to the first access network device, wherein the second NAS message comprises an identifier of the user plane function network element, and the identifier of the user plane function network element indicates the terminal to establish the session with the user plane function network element using the second access technology.

6. The session establishment system according to claim 5, wherein the second NAS message further comprises a terminal identifier, wherein the terminal identifier is used by the user plane function network element to identify the terminal.

7. The session establishment system according to claim 5, wherein the system further comprises the first access network device, the first access network device is configured to: send the second NAS message to the terminal, wherein the second NAS message comprises an identifier of the user plane function network element.

8. The session establishment system according to claim 7, wherein the second NAS message further comprises second indication information, wherein the second indication information indicates the session establishment procedure between the terminal and the user plane function network element to be initiated by using the second access technology.

9. A session establishment method, wherein the method comprises:
- receiving, by a session management network element, a first non-access stratum (NAS) message from a first access network device corresponding to a first access technology, wherein the first NAS message is for requesting to establish a session for a terminal;
- allowing, by the session management network element based on subscription data of the terminal, the terminal to establish the session by using a second access technology;
- selecting, by the session management network element, a user plane function network element that supports access using the second access technology;
- sending, by the session management network element, a first message to the user plane function network element;
- receiving, by the session management network element, a second message from the user plane function network element, wherein the second message comprises the network-side session resource; and
- sending, by the session management network element, a second NAS message to the first access network device, wherein the second NAS message comprises an identifier of the user plane function network element, and the identifier of the user plane function network element directs the terminal to establish the session with the user plane function network element using the second access technology.

10. The session establishment method according to claim 9, wherein the identifier of the user plane function network element includes an internet protocol (IP) address of the user plane function network element, or a fully qualified domain name (FQDN) identifier of the user plane function network element.

11. A session management network element device, comprises:
- at least one processor; and
- a computer-readable storage medium coupled to the at least one processor and configured to store instructions for execution by the at least one processor such that when executed, cause the at least one processor to:
  - receive a first non-access stratum (NAS) message from a first access network device corresponding to a first access technology, wherein the first NAS message is for requesting to establish a session for a terminal;
  - allow the terminal to establish the session by using a second access technology based on subscription data of the terminal;
  - select a user plane function network element that supports access using the second access technology;
  - send a first message to the user plane function network element;
  - receive a second message from the user plane function network element, wherein the second message comprises the network-side session resource; and
  - send a second NAS message to the first access network device, wherein the second NAS message comprises an identifier of the user plane function network element, and the identifier of the user plane function network element indicates to the terminal to establish the session with the user plane function network element using the second access technology.

12. The session management network element device of claim 11, wherein the identifier of the user plane function network element includes an internet protocol (IP) address of the user plane function network element, or a fully qualified domain name (FQDN) identifier of the user plane function network element.

* * * * *